April 18, 1950  H. C. HOPP  2,504,689

REFRIGERATED VEHICLE

Filed May 14, 1946  6 Sheets-Sheet 1

INVENTOR
Harold C. Hopp
BY
Kenyon & Kenyon
ATTORNEYS

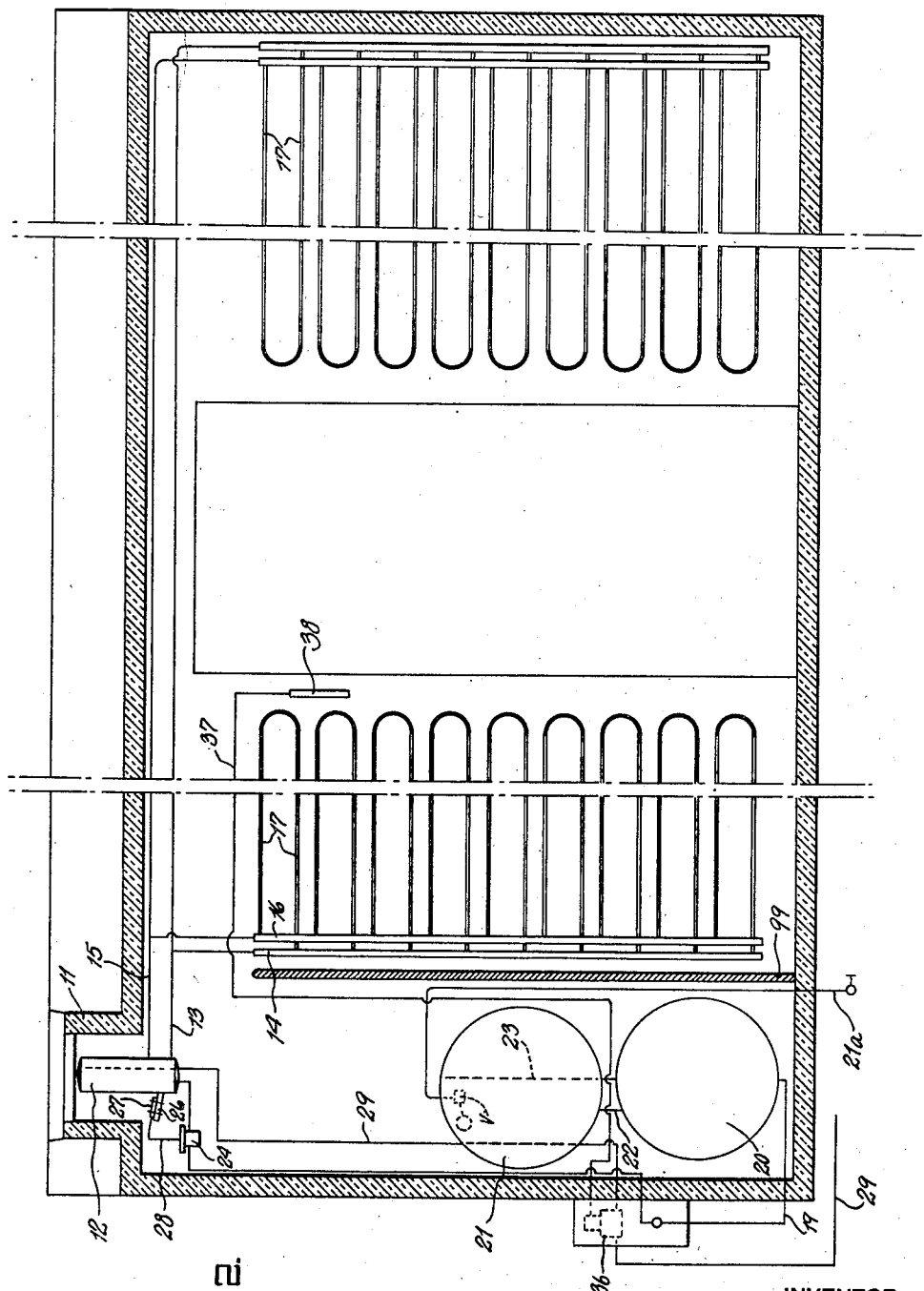

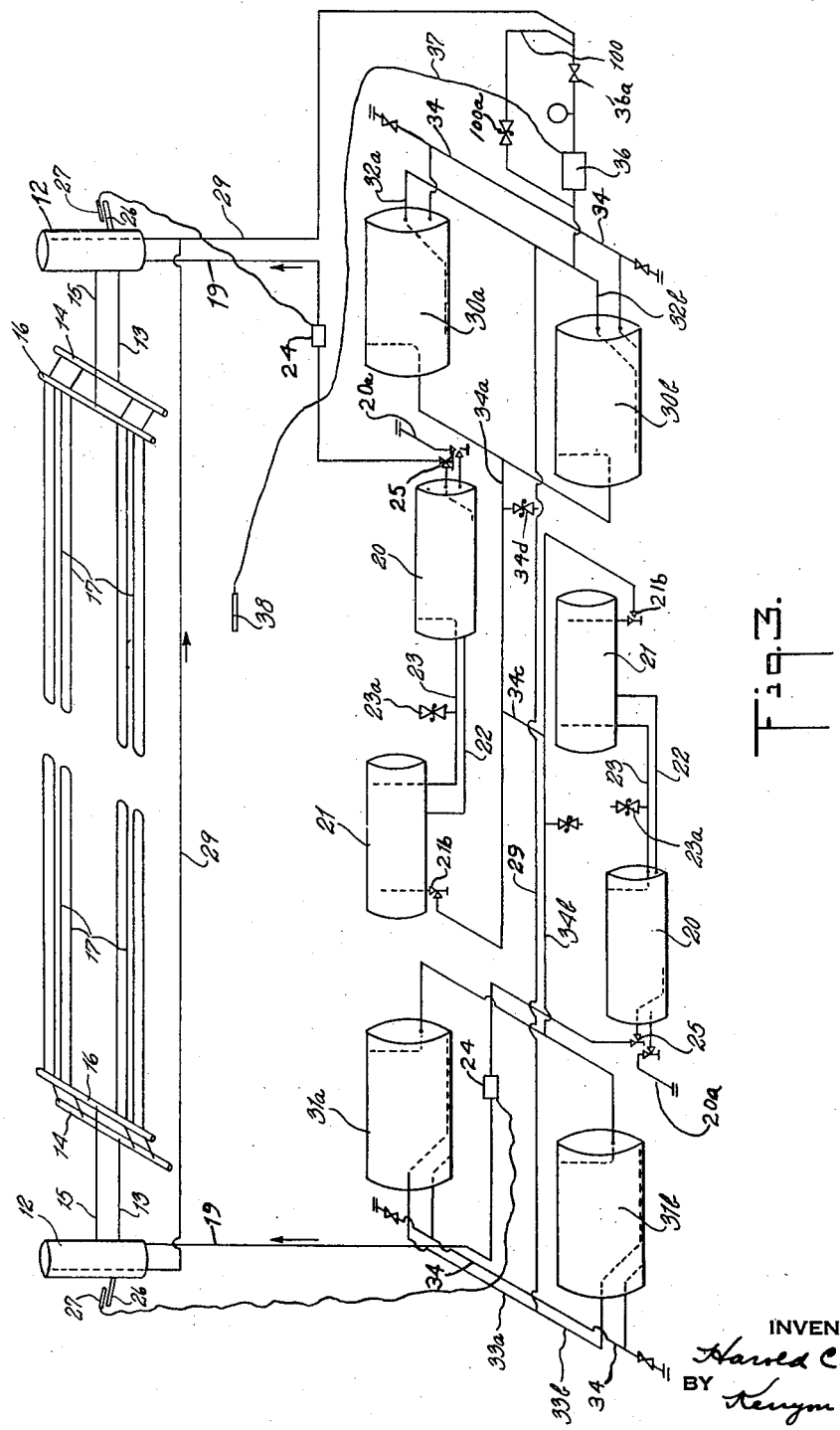

April 18, 1950        H. C. HOPP        2,504,689
REFRIGERATED VEHICLE
Filed May 14, 1946        6 Sheets-Sheet 4
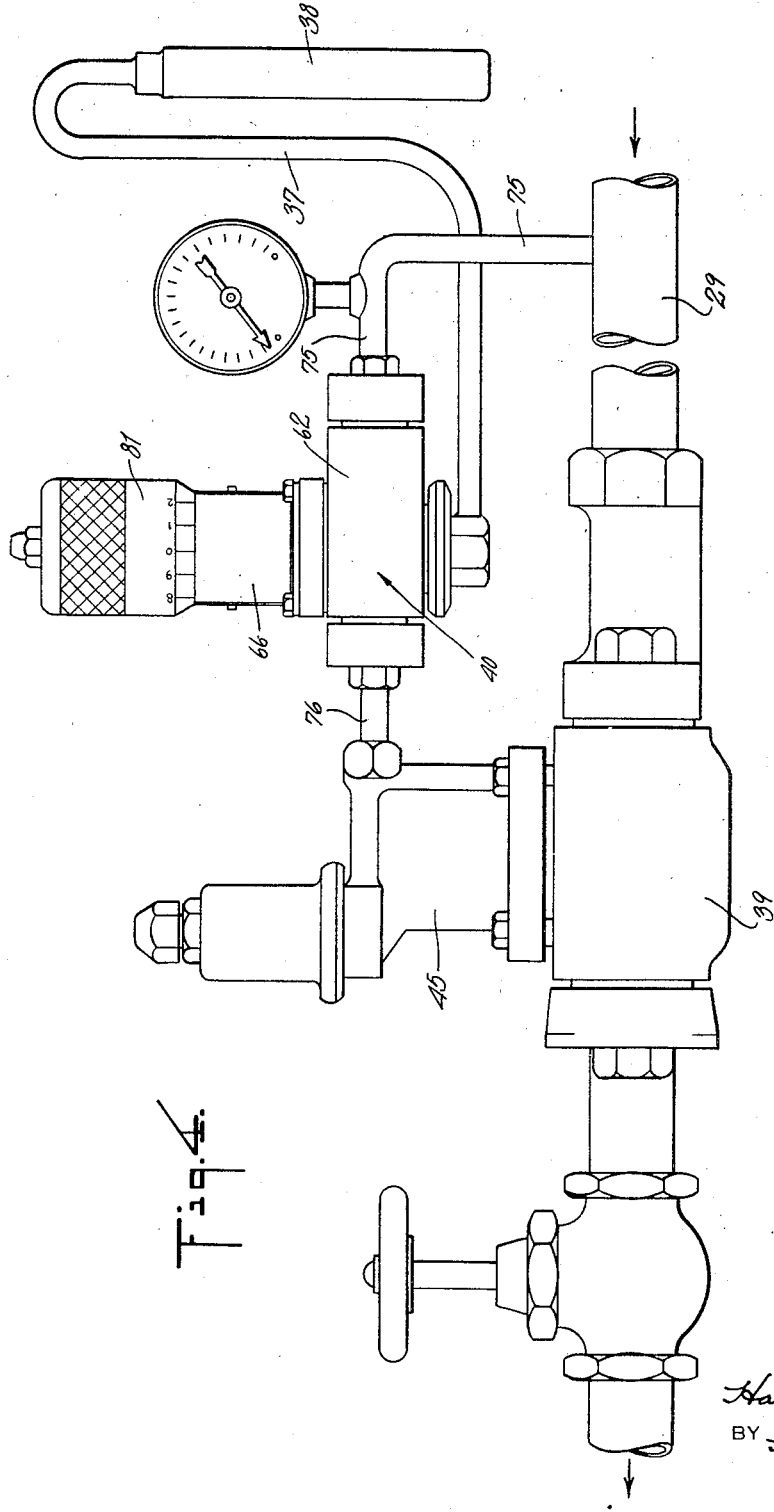
INVENTOR
Harold C. Hopp
BY Kenyon & Kenyon
ATTORNEYS April 18, 1950          H. C. HOPP          2,504,689
REFRIGERATED VEHICLE
Filed May 14, 1946          6 Sheets-Sheet 5
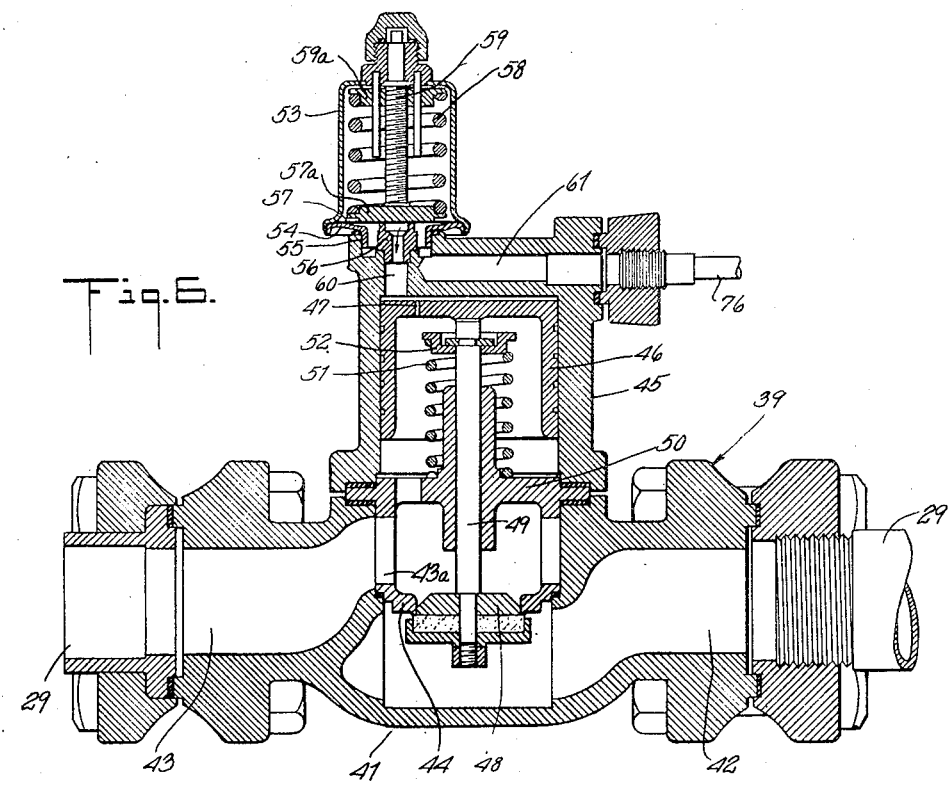
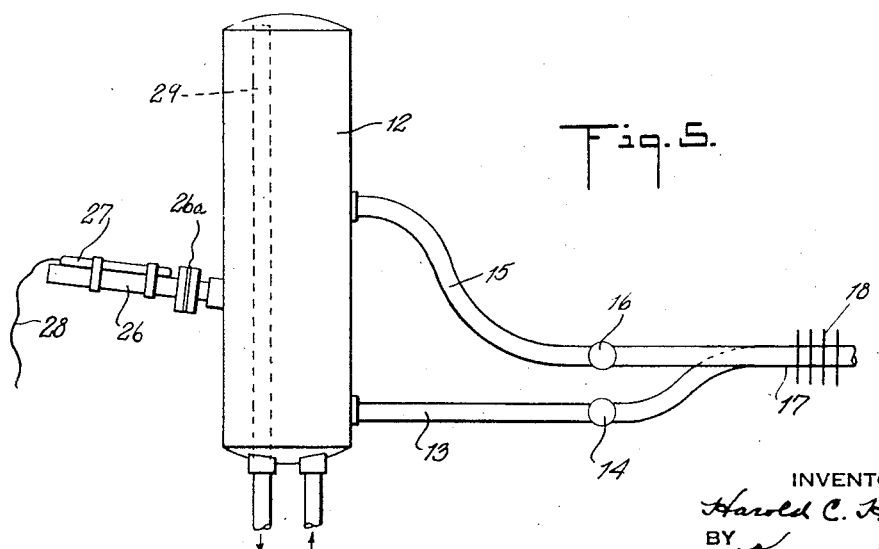
INVENTOR
Harold C. Hopp
BY Kenyon & Kenyon
ATTORNEYS April 18, 1950 H. C. HOPP 2,504,689
REFRIGERATED VEHICLE
Filed May 14, 1946 6 Sheets-Sheet 6
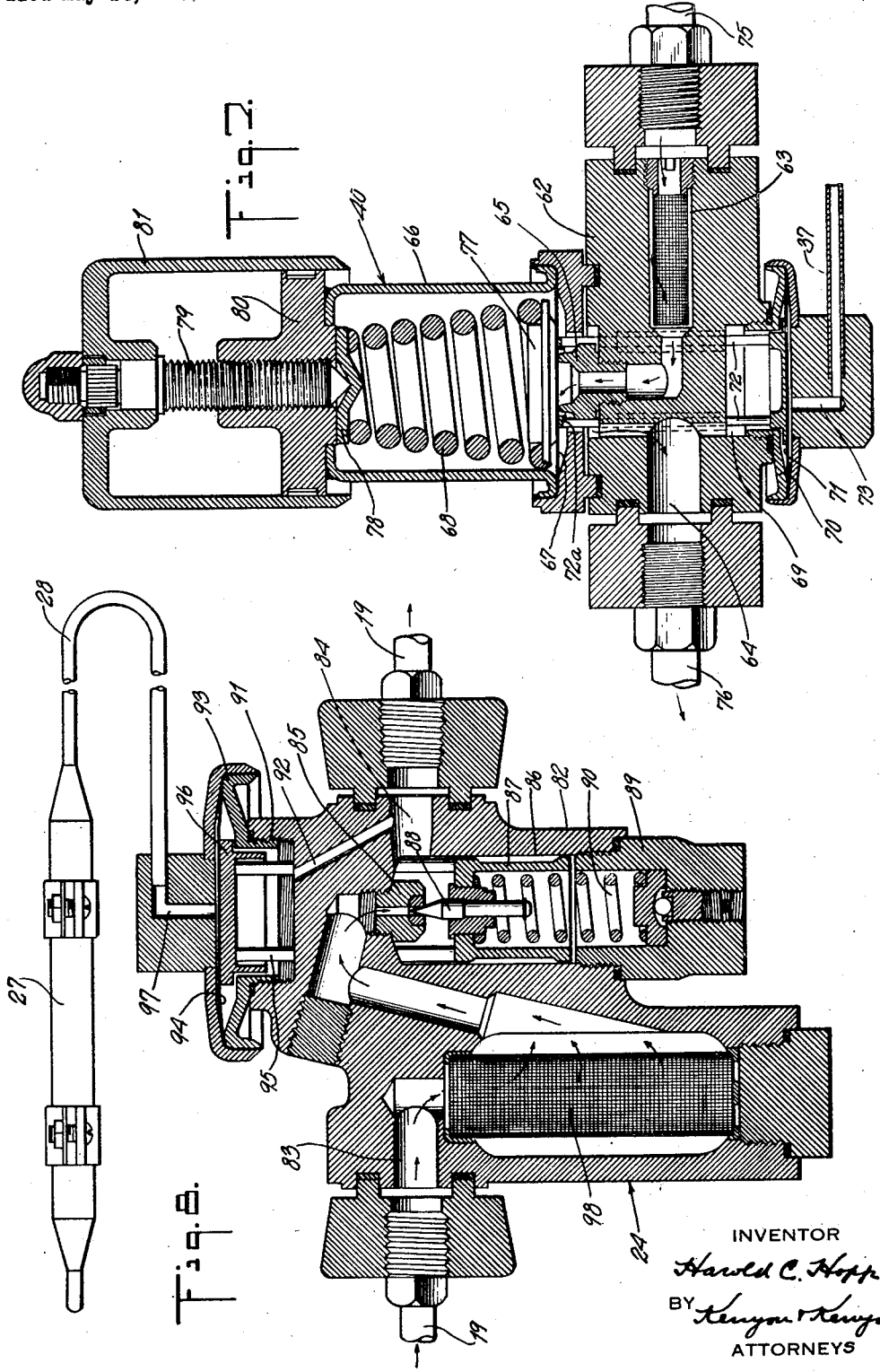
INVENTOR
Harold C. Hopp
BY Kenyon & Kenyon
ATTORNEYS Patented Apr. 18, 1950

2,504,689

UNITED STATES PATENT OFFICE 2,504,689

REFRIGERATED VEHICLE

Harold C. Hopp, Des Plaines, Ill., assignor, by mesne assignments, to Frigid Transport Company, Inc., New York, N. Y., a corporation of New York Application May 14, 1946, Serial No. 669,516

23 Claims. (Cl. 62—5)

1

This invention relates to refrigerated vehicles such, for example, as railway cars and trucks.

An object of this invention is to provide a refrigerated vehicle equipped with cooling apparatus of relatively low initial cost and which may be operated at a high degree of efficiency at a low operating cost and has a long working life and is of such arrangement as to take up the minimum amount of space within the vehicle in which it is installed.

Another object is to provide such a refrigerated vehicle with a novel control for the refrigerating means which provides for cooling when the temperature in the body of the vehicle rises above the desired point but which controls the temperature of the heat exchange unit in the body of the vehicle to keep it from dropping to such a low temperature that it will dehydrate the cargo.

The cooling apparatus is of the absorbent type and the vehicle is equipped with a container or holder for liquid refrigerant and a container or holder for absorbent liquid. Preferably, these containers or holders are arranged exterior of the vehicle and the absorbent holder is provided with cooling fins, but in some instances the liquid refrigerant holder is arranged within the vehicle body. The vehicle is provided with one or more cupolas at one or both ends and in each cupola is arranged a surge tank. Each surge tank is connected to an evaporator consisting of several coils arranged either adjacent the vehicle ceiling or the vehicle side walls. This evaporator is relatively large so that cooling of the car can be effected with a minimum temperature differential between evaporator and the air in the refrigerated space in the car. The connections are such that liquid refrigerant flows from the surge tank into the evaporator from a low level and vaporized refrigerant is returned to the surge tank at a higher level. Means are provided for maintaining the level of the liquid refrigerant in the surge tank intermediate the two connections and at a sufficient height to provide adequate head to keep the evaporator filled with the liquid refrigerant at all times even when the car is in motion or is on a grade. Vaporized refrigerant flows from the top of the surge tank to the absorbent holder and the flow of the vaporized refrigerant is controlled by valve mechanism responsive to the temperature in the vehicle body. The control mechanism is of such design as to prevent the evaporator attaining a sufficiently low temperature to effect dehydration of the car contents.

2

Other objects, novel features and advantages of this invention will become apparent from the following specification and accompanying drawings, wherein:

Fig. 2 is a view similar to Fig. 1 of a modified form of the invention;

Fig. 3 is a schematic view of Fig. 1;

Fig. 4 is an elevation of the mechanism for controlling the flow of vaporized refrigerant from the evaporator to the absorber;

Fig. 5 is an elevation of the surge tank;

Fig. 6 is a section through one of the units making up the mechanism of Fig. 4;

Fig. 7 is a section through the remaining unit of the mechanism of Fig. 4; and

Fig. 8 is a section through the valve controlling the flow of liquid refrigerant to the surge tank.

Figure 1:
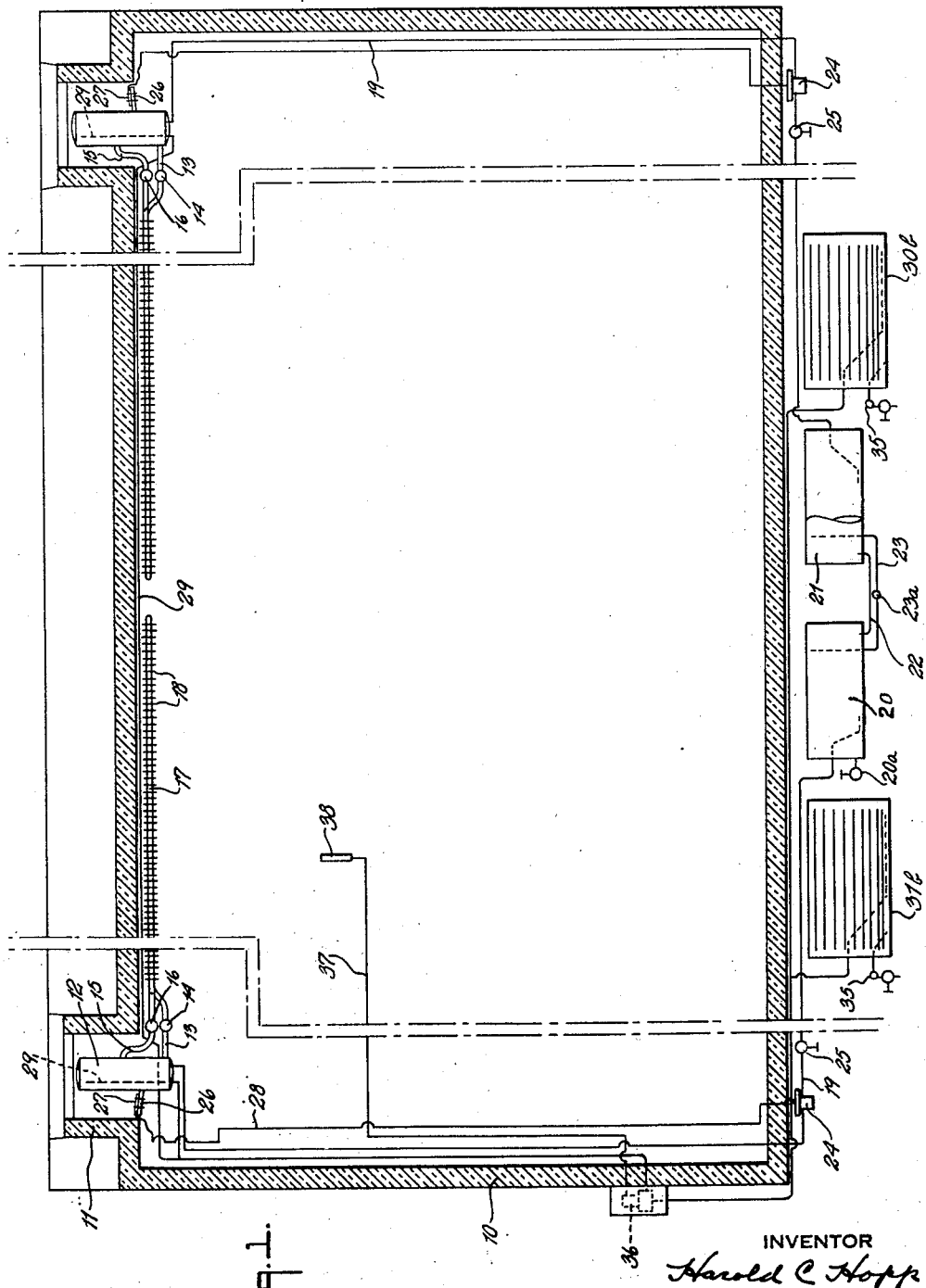
Figure 1 is a section through a railway car equipped with cooling equipment embodying the invention.

In the form of the invention shown in Fig. 1, 10 designates the body of a railway car equipped with suitable running gear (not shown). The body is suitably heat insulated and its interior forms the space to be refrigerated. At each end of the car there is provided a cupola 11 in which is arranged a vertical cylindrical tank 12 hereinafter referred to as a surge tank. A pipe 13 leads from the lower portion of each tank 12 to a transverse header 14 while a pipe 15 leads from each tank 12 at a higher elevation than the pipe 13 to a transverse header 16 located above the header 14. A plurality of U-shaped pipes 17 extend approximately half the length of the car 10 adjacent the car ceiling and each pipe has one end connected to the header 14 and its other end connected to the header 16, the end connected to the header 14 being offset from the end connected to the header 16 so that the series of pipes 17 lie in a common horizontal plane. Preferably, the pipes 17 are each provided with radiating fins 18.

A refrigerant holder is provided for each of the surge tanks 12. Each holder is suitably supported beneath the bottom of the car body 10 and is connected through a pipe 19 to the bottom of each surge tank 12. Each refrigerant holder consists of two tanks 20 and 21 having a pipe 22 providing communication between the bottom portions thereof. A pipe 23 provides communication between the upper portions of the tanks 20 and 21 and is provided with a relief valve 23a. Each end of each pipe 23 enters the bottom of a tank and extends nearly to the top thereof.

A valve-controlled pipe 20a is provided at the bottom of each tank 20 for supplying liquid refrigerant to the tank.

In each instance the pipe 19 is provided a valve 24 which is responsive to changes of liquid level in the surge tank 12 to control the flow of liquid refrigerant thereto and a manual valve 25. The controls means for the valve 24 include a closed nipple 26 which extends obliquely from the surge tank 12 and communicates therewith intermediate the points of communication with the tank 12 of the pipes 13 and 15 (Fig. 5). The nipple 26 is heat insulated from the tank 12 by a gasket 26a of suitable material. A cylindrical bulb 27 is strapped to the nipple 26 near its outer end and a capillary tube 28 leads to the valve 24, the tube and bulb being filled with a volatile liquid. The valve 24 is actuated in accordance with the liquid level in surge tank 12. When the liquid level is such that the cold liquid refrigerant fills the nipple 26 the refrigerant chills the bulb 27 which closes the valve 24. When the liquid level falls to such a point that there is no liquid refrigerant in the nipple 26, the bulb 27 is not chilled and the liquid in the bulb 27 expands to open the valve 24 to supply more refrigerant. This maintains a substantially constant liquid level in the surge tank 12.

For proper operation of the refrigerating system the nipple should be located at a level higher than the evaporator so that a head of liquid is maintained to keep the evaporator full of liquid refrigerant at all times. It has been found that a head of about five inches will accomplish this for all movements of the car in operation and on grades encountered in railroad operation.

A pipe 29 leads from near the top of each surge tank 12 through the bottom thereof to an absorbent holder supported beneath the bottom of the vehicle body. The absorbent holder consists of tanks 30a, 30b, 31a and 31b. The pipe 29 communicates with the interior of the tanks 30a and 30b through the branches 32a and 32b and with the tanks 31a and 31b through branches 33a and 33b. The pipes 32a, 32b, 33a and 33b have end sections lying on the bottom of the absorbent tanks and the tanks 30a and 30b are connected through a pipe 34a with one refrigerant holder tank 21 while the tanks 31a and 31b are connected through a pipe 34b with the other refrigerant holder tank 21. A pipe 34c interconnects the pipes 34a and 34b. Manually operable valves 21b segregate the refrigerant holder from the absorbent holder respecting this pressure interconnecting system. A pressure relief valve 34d in the pipe 34a keeps the pressure from rising dangerously in the absorbent holder system as do the pressure relief valves 23a for the refrigerant holder system. Each end of each pipe 34a and 34b enters the bottom of a tank and extends nearly to the top of the tank. Each absorbent tank is provided with a valve-controlled pipe 34 for supplying liquid to or withdrawing liquid therefrom.

The temperature in the refrigerated space in the car body is controlled thermostatically and there are also provided means to control the temperature of the evaporator to keep it from dropping to such a low point that there will be such a temperature differential between the evaporator and the air of the car that dehydration will take place. These control means control the flow of evaporated refrigerant from the evaporator and prevent evaporation if the evaporator is chilled by evaporation of the refrigerant to such an extent that the pressure in the evaporator and the return line falls below a predetermined minimum but permit evaporation of the refrigerant if the pressure rises above this point and the temperature of the refrigerated space rises above a predetermined point.

In the pipe 29 the mechanism 36 controls the flow of vaporized refrigerant through the pipe 29 from the surge tank 12 to the absorbent holder in response to temperature variations in the car body. There is also a manual valve 36a for shutdown conditions. A capillary tube 37 leads from the control mechanism 36 to a cylindrical bulb 38 arranged in the car body, the tube and bulb being filled with a volatile liquid. The arrangement is such that the control mechanism 36 opens in response to temperature increase within the car body and closes in response to temperature decrease within the car body.

The flow control mechanism 36 comprises two valve units 39 and 40. The valve unit 39 (Fig. 6) consists of a casing 41 fitted between sections of the pipe 29 and having an inlet port 42 and an outlet port 43 with an interposed valve seat 44 with a passageway 43a interconnecting the seat 44 and the outlet port 43. A cylindrical housing 45 attached to the casing 41 by means, not shown, constitutes a cylinder in which is slidably mounted a piston 46 having an end orifice 47. A valve head 48 is arranged to engage the seat 44 and is connected to the piston 46 by a stem 49. The stem 49 passes through an apertured member 50 and a spring 51 is interposed between the member 50 and a collar 52 fixed to the stem 49 biases the head 48 against the seat 44.

A bonnet 53 has in one end an opening surrounded by a collar 54 which projects into and is fixed in a recess 55 formed in the housing 45. The housing 45 supports an annular seat 56, one end of which is engaged by a diaphragm 57 arranged in the bonnet 53 and biased toward the seat by a spring 58. The bonnet 53 rotatably supports a shaft 59 on which is threaded a button 59a engaging one end of the spring 58. A button 57a is interposed between the diaphragm 57 and the other end of the spring 58. Rotation of the shaft 59 changes the position of the button 59a to adjust the tension of the spring 58. The bore of the seat 56 communicates through a passageway 60 with the space between the piston 46 and the inner end of the cylinder receiving the piston while the recess 55 communicates with a passageway 61.

The second unit 40 (Fig. 7) consists of a casing 62 having an inlet 63 and an outlet 64 between which is arranged a valve seat 65. A bonnet 66 attached to the casing 62 by means, not shown, is closed at one end by a diaphragm 67 which engages the valve seat 65. A spring 68 in the bonnet 66 biases the diaphragm toward the seat 65. Opposite the valve seat 65 is provided a recess 69 into which is threaded a hollow bonnet 70 containing a diaphragm 71. Rods 72 extend through bores in the casing 62 between buttons 72a engaging the diaphragms 71 and 67. A passageway 73 in the housing 70 has one end terminating adjacent the diaphragm 71 and its other end communicating with the capillary tube 37. A pipe 75 leads from the pipe 29 to the inlet 63 and a pipe 76 leads from the outlet 64 to the passageway 61 of the unit 39. The spring 68 is interposed between a button 77 engaging the diaphragm 67 and a button 78 is engaged by the end of a screw 79 threaded into a platform 80 anchored to the end of the bonnet 66. The screw supports a cap 81. The tension of the spring 68 may be varied by rotation of the cap 81.

The unit 24 (Fig. 8) consists of a casing 82 having an inlet 83 and an outlet 84 with interposed valve seat 85. In the casing 82 is provided a cylindrical recess 86 in which is slidably mounted a piston 87 carrying a needle valve 88 cooperating with the valve seat 85. The recess 86 is closed by a plug 89 between which and the piston 87 is arranged a spring 90 biasing the valve 88 toward the seat 85.

In the casing 82 is a second recess 91 communicating through the passage 92 with the outlet 84. A bonnet 93 has a portion threaded into the recess 91 and contains a diaphragm 94. Rods 95 passing through bores in the casing 82 extend between the piston 87 and a button 96 engaging the diaphragm 94. A passageway 97 in the bonnet 93 has one end adjacent the diaphragm 94 and communicates with the tube 28. A filter 98 is arranged in the inlet 83 of the casing 82.

With the liquid level in the surge tank 12 below the inner end of the nipple 26, the temperature in the bulb 27 is considerably higher than that of the liquid in the tank. When this is the case, the liquid in the bulb and the tube 28 is expanded to force the diaphragm 94 downwardly, thereby moving the valve 88 away from the seat 85 to permit the flow of liquid refrigerant from the liquid refrigerant tank 20 through the valve 24 into the surge tank 12 under the influence of the vapor pressure in the holder. Upon cooling of the bulb 27 by reason of rise of the liquid level in the surge tank 12, the liquid in the bulb 26 contracts, thereby permitting elevation of the diaphragm 94 together with the valve 88 under the influence of the spring 90 to reduce flow through the valve 24.

With a high temperature existing in the car body the evaporator is controlled as follows: The liquid in the bulb 38 is expanded, thereby elevating the diaphragm 71 and through the rods 72 elevating the diaphragm 67 against the action of the spring 68 to lift the diaphragm 67 from the valve seat 65, thereby permitting flow from the pipe 29 through the pipe 75 to the pipe 76, and thence to passageway 61. When the pressure in the passageway 61 is sufficient to overcome the bias of the spring 58, the diaphragm 57 is lifted to permit flow through the seat 56 into the passageway 60 to apply pressure to the piston 46. When this pressure exceeds the bias of the spring 51, the piston 46 moves downwardly to unseat the valve 48, thereby permitting flow from the evaporator to the absorber. Upon decrease of temperature in the car body, the liquid in the cylinder 38 contracts, thereby permitting sufficient downward movement of the diaphragms 71 and 67 to close the valve seat 65 and interrupt flow through the casing 62 to the passageway 61. Gas on top of the piston 46 leaks out through the orifice 47 permitting the spring 51 to reseat the valve 48 and the spring 49 to reengage the diaphragm 57 with the seat 56. The reseating of the valve 48 interrupts flow from the evaporator to the absorber.

The refrigerating equipment employed has an evaporator which presents a relatively large area to the air in the space to be refrigerated so that cooling can be effected with a small temperature differential to minimize dehydration of cargo in the space to be refrigerated and the controls of the evaporator are such that if the demands of the refrigerated space are such that the evaporation of the refrigerant in the evaporator continues to such a point that the evaporator is cooled to such a point that it would tend to dehydrate the cargo excessively, the passage from the evaporator to the absorber is closed to check evaporation until the temperature differential between the evaporator and the air in the space to be refrigerated has been reduced and the evaporator has warmed up sufficiently to create a predetermined pressure of evaporated refrigerant. This is accomplished in the flow control mechanism 36 through the means shown in Fig. 6 responsive to the pressure in the evaporator and the pipe 29.

The tension of the spring 58 is so adjusted that the pressure required to disengage the diaphragm 57 from the seat 56 exceeds that exerted by vaporized refrigerant at a predetermined temperature which may be approximately freezing temperature. Thus, even though the valve 40 may be opened by reason of high temperature existing within the body 10, the valve 39 remains closed whenever the refrigerant vapor is at the predetermined temperature or below it. This arrangement effectively prevents the evaporator from attaining excessively low temperatures and from excessively freezing out moisture from the air circulating around the evaporator and thereby prevents dehydration of the contents of the vehicle body. Although the condition of low temperature in the evaporator and high temperature in the vehicle body exists primarily upon starting of the cooling system, it is nevertheless advantageous to minimize the possibility of any dehydration being effected during the period of cooling the car vehicle body and it is also desirable as a safety factor to minimize dehydration at other times when outside heat conditions may bring about a similar condition.

A valve-controlled by-pass 100 is provided around the flow control mechanism 36. In this by-pass the valve 100a is a pressure relief valve for protecting the evaporator system when the valve 36a is closed during shut-downs.

In the embodiment of the invention shown in Fig. 2, the refrigerant holder tanks 20 and 21 are arranged in a compartment within the vehicle body, such compartment being formed by the partition 99. The two sets of headers 14 and 16 extend vertically of the side walls of the body 10 and both sets are connected to a single surge tank 12 by the pipes 13 and 15. Pipes 17 have their ends connected to the headers 14 and 16 to constitute the coils making up the evaporator. A pipe 22 permits flow of liquid from the tank 21 to the tank 20 while a pipe 23 provides communication between the top of the tank 20 and the top of the tank 21. The tank 21 is provided with a valve-controlling filling pipe 21a and a float valve V is arranged within the tank 21 at the end of the pipe 21a to limit the flow of liquid thereinto. The tank 20 is connected by the pipe 19 to the surge tank 12 and in the pipe 19 is provided the valve 24 connected by the capillary tube 28 to the bulb 27 supported by the closed nipple 26 attached to the surge tank as previously described. The surge tank 12 is connected by a pipe 29 leading from the top of the surge tank to the absorber (not shown) and control mechanism 36 regulates the flow of vaporized refrigerant in response to the temperature in the car body through the medium of the bulb 38 connected to the control mechanism through the capillary tube 37. The absorbent holder consists of a plurality of tanks such as shown in Fig. 3 but not shown in Fig. 2 in view of space limitations in that figure. However, the absorbent holder tanks are connected to the pipe 29 in the same manner as shown in Fig. 3 and also the absorbent holding tanks are connected to the tanks 20 and 21 as shown in Fig. 3 and are provided with suitable connections for supplying liquid to and withdrawing liquid therefrom. The operation of the embodiment of Fig. 2 is the same as the operation of the embodiment of Fig. 1.

The connections 23 between the refrigerant holder tanks 20 and 21 are for the purpose of equalizing the vapor pressure in the two holders to permit flow of liquid from the tank 20 to the tank 21 through the pipe 22. The connections 34a and 34b between the refrigerant holder tanks and the absorbent holder tanks permit the use of the vapor pressure in the refrigerant holding tanks for the purpose of expelling liquid absorbent from the absorbent holder temperature during the operation of emptying the latter. This is done by opening the valve 21b as required and closing the valve 36a.

I claim:

1. A mobile refrigerated vehicle comprising a body, a refrigerant holder supported by said body, an absorbent holder also supported by said body, an evaporator within said body, a tank within said body adjacent the ceiling thereof, conduits leading from said tank at different elevations to said evaporator, a first connection for conducting liquid from said refrigerant holder to said tank, a second connection for conducting vapor from said tank to said absorbent holder, means in said first connection for controlling liquid flow therethrough in response to the liquid level in said tank, and means in said second connection for controlling the flow of vapor therethrough in response to the temperature level of said body.

2. A mobile refrigerated vehicle according to claim 1 characterized by provision in said vapor flow control means for preventing the temperature of said evaporator dropping below a predetermined level.

3. A mobile refrigerated vehicle comprising a body, a refrigerant holder carried by said body, an absorbent holder also carried by said body, an evaporator within said body in system between said refrigerant and absorbent holders, a tank within said body adjacent the ceiling thereof and in system between said refrigerant holder and said evaporator, conduits interconnecting said tank at different elevations to said evaporator, means for maintaining a predetermined depth of liquid refrigerant in said tank, and means for controlling the pressure in said evaporator in response to the temperature level in said body.

4. A mobile refrigerated vehicle according to claim 3 and including means for preventing the temperature of said evaporator dropping below a predetermined level.

5. In a refrigerated vehicle having a space to be refrigerated, the combination of a refrigerant container, an absorbent container supported externally of said space to be refrigerated, an evaporator in said space to be refrigerated and extending horizontally adjacent the top of said space, a tank extending above said evaporator, a supply line extending from said refrigerant container to said tank, a second supply line extending from said tank to said evaporator, a return line extending from said evaporator to said tank and having an outlet at a level above that of said evaporator, means controlling the flow through said first supply line to maintain the level of refrigerant in said tank below the point of entry of said return line and above the level of said evaporator, a second return line extending from said tank above the refrigerant level to said absorbent container, a valve in said second return line, thermostatic control means therefor responsive to the temperature in said space to be refrigerated, and means responsive to the pressure in said second return line to maintain said valve in closed position when the pressure in said second return line falls below a predetermined point.

6. In a refrigerated vehicle having a space to be refrigerated, the combination of a refrigerant container, an absorbent container supported externally of said space to be refrigerated, an evaporator in said space to be refrigerated, a tank extending above said evaporator, a supply line extending from said refrigerant container to said tank, a second supply line extending from said tank to said evaporator, a return line extending from said evaporator to said tank and having an outlet at a level above that of said evaporator, means controlling the flow through said first supply line to maintain the level of refrigerant in said tank below the point of entry of said return line and above the level of said evaporator, a second return line extending from said tank above the refrigerant level to said absorbent container, a valve in said second return line, thermostatic control means therefor responsive to the temperature in said space to be refrigerated, and means responsive to the pressure in said second return line to maintain said valve in closed position when the pressure in said second return line falls below a predetermined point.

7. In a refrigerated vehicle having a space to be refrigerated, the combination of a refrigerant container, an absorbent container supported externally of said space to be refrigerated, an evaporator in said space to be refrigerated and extending horizontally adjacent the top of said space, a tank extending above said evaporator, a supply line extending from said refrigerant container to said tank, a second supply line extending from said tank to said evaporator, a return line extending from said evaporator to said tank and having an outlet at a level above that of said evaporator, means controlling the flow through said first supply line to maintain the level of refrigerant in said tank below the point of entry of said return line and above the level of said evaporator, a second return line extending from said tank above the refrigerant level to said absorbent container, a valve in said second return line, and thermostatic control means therefor responsive to the temperature in said space to be refrigerated.

8. In a refrigerated vehicle having a space to be refrigerated, the combination of a refrigerant container, an absorbent container supported externally of said space to be refrigerated, an evaporator in said space to be refrigerated, a tank extending above said evaporator, a supply line extending from said refrigerant container to said tank, a second supply line extending from said tank to said evaporator, a return line extending from said evaporator to said tank and having an outlet at a level above that of said evaporator, means controlling the flow through said first supply line to maintain the level of refrigerant in said tank below the point of entry of said return line and above the level of said evaporator, a second return line extending from said tank above the refrigerant level to said absorbent container, a valve in said second return line, and thermostatic control means therefor responsive to the temperature in said space to be refrigerated.

9. In a refrigerated vehicle having a space to be refrigerated, the combination of an absorbent container supported externally of said space to be refrigerated, an evaporator in said space to be refrigerated, means for maintaining a supply of liquid refrigerant in said evaporator, a gas line to conduct gaseous refrigerant from said evaporator to said absorbent container, a valve in said gas line, a thermostatic control means for said valve responsive to temperature in said space to be refrigerated, and means controlled by gas pressure in said gas line to prevent flow through said valve when the pressure in said gas line falls below a predetermined minimum.

10. In a refrigerated vehicle having a space to be refrigerated, the combination of an absorbent container supported externally of said space to be refrigerated, an evaporator in said space to be refrigerated, means for maintaining a supply of liquid refrigerant in said evaporator, a gas line to conduct gaseous refrigerant from said evaporator to said absorbent container, and means responsive to pressure in said gas line to prevent the flow of gas therethrough when the pressure in said gas line falls below a predetermined minimum and for preventing the flow of the gas therethrough when the temperature in said space to be refrigerated falls below a predetermined point but permitting flow therethrough when the pressure in said gas line has reached said predetermined minimum and the temperature in said space to be refrigerated has risen above said predetermined point.

11. In a refrigerated vehicle having a space to be refrigerated, the combination of a refrigerant container, an absorbent container supported externally of said space to be refrigerated, an evaporator in said space to be refrigerated and extending horizontally adjacent the top of said space to be refrigerated, a tank extending above said evaporator, a supply line extending from said refrigerant container to said tank, a second supply line extending from said tank to said evaporator, a return line extending from said evaporator to said tank at a level above that of said evaporator, means controlling the flow through the first supply line to maintain the level of refrigerant in said tank below the point of entry of said return line and above the level of said evaporator, a second return line extending from said tank above the refrigerant level therein to said absorbent container, and means responsive to pressure in said second return line to prevent flow therethrough when said pressure falls below a predetermined minimum and for preventing flow therethrough when the temperature in said space to be refrigerated falls below a predetermined point and for permitting flow therethrough when the pressure in said second return line has reached said predetermined minimum and the temperature in said space to be refrigerated has risen to said predetermined point.

12. In a refrigerated vehicle having a space to be refrigerated, the combination of a refrigerant container, an absorbent container supported externally of said space to be refrigerated, an evaporator in said space to be refrigerated, a tank extending above said evaporator, a supply line extending from said refrigerant container to said tank, a second supply line extending from said tank to said evaporator, a return line extending from said evaporator to said tank at a level above that of said evaporator, means controlling the flow through the first supply line to maintain the level of refrigerant in said tank below the point of entry of said return line and above the level of said evaporator, a second return line extending from said tank above the refrigerant level therein to said absorbent container, and means responsive to pressure in said second return line to prevent flow therethrough when said pressure falls below a predetermined minimum and for preventing flow therethrough when the temperature in said space to be refrigerated falls below a predetermined point and for permitting flow therethrough when the pressure in said second return line has reached said predetermined minimum and the temperature in said space to be refrigerated has risen to said predetermined point.

13. In a refrigerated vehicle having a space to be refrigerated, the combination of a refrigerant container, an absorbent container supported externally of said space to be refrigerated, an evaporator in said space to be refrigerated and extending horizontally adjacent the top of said space to be refrigerated, a tank extending above said evaporator, a supply line extending from said refrigerant container to said tank, a second supply line extending from said tank to said evaporator, a return line extending from said evaporator to said tank at a level above that of said evaporator, means controlling the flow through the first supply line to maintain the level of refrigerant in said tank below the point of entry of said return line and above the level of said evaporator, a second return line extending from said tank above the refrigerant level therein to said absorbent container, and thermostatically controlled means responsive to the temperature in said space to be refrigerated controlling the flow through said second return line, and means for preventing said evaporator from becoming cooled below a predetermined point.

14. In a refrigerated vehicle having a space to be refrigerated, the combination of a refrigerant container, an absorbent container supported externally of said space to be refrigerated, an evaporator in said space to be refrigerated, a tank extending above said evaporator, a supply line extending from said refrigerant container to said tank, a second supply line extending from said tank to said evaporator, a return line extending from said evaporator to said tank at a level above that of said evaporator, means controlling the flow through the first supply line to maintain the level of refrigerant in said tank below the point of entry of said return line and above the level of said evaporator, a second return line extending from said tank above the refrigerant level therein to said absorbent container, and thermostatically controlled means responsive to the temperature in said space to be refrigerated controlling the flow through said second return line, and means for preventing said evaporator from becoming cooled below a predetermined point.

15. In a refrigerator system of the type comprising a body to be refrigerated, a refrigerant holder, an evaporator in heat exchange relation to said body, an absorbent holder, and means providing for the passage of refrigerant from said refrigerant holder through said evaporator to said absorbent holder, means for controlling the differential temperature between said body and said evaporator comprising in combination first means for restricting the flow of said refrigerant from said evaporator to said absorbent holder when the temperature of said evaporator drops below a predetermined value, and second means responsive to the temperature of said body for restricting said flow when the temperature of said body drops below another predetermined value.

16. A system as in claim 15 wherein said first and second means are so constructed and arranged that when the temperature of said body is below said other predetermined value said second means prohibits said first means from opening said flow.

17. In a refrigerator system of the type comprising a body to be refrigerated, a holder for refrigerant to be vaporized, an evaporator in which said refrigerant is vaporized positioned in heat exchange relation to said body, an absorbent holder for receiving said refrigerant after vaporization, and first and second conduits respectively between said refrigerant holder and evaporator and between said evaporator and absorbent holder providing for the passage of refrigerant from said refrigerant holder through said evaporator to said absorbent holder, means for controlling the differential temperature between said body and said evaporator comprising in combination pressure responsive means responsive to the pressure of said refrigerant in said evaporator for restricting the flow of said refrigerant through said second conduit when the temperature of said evaporator drops below a predetermined value, and temperature responsive means responsive to the temperature of said body for restricting said flow when the temperature of said body drops below another predetermined value.

18. A system as in claim 17 wherein said pressure and temperature responsive means are so constructed and arranged that when the temperature of said body is below a said other predetermined value said temperature responsive means prohibits said pressure responsive means from opening said flow.

19. In a system as in claim 17, a surge tank in said first conduit for controlling the flow of unevaporated refrigerant to said evaporator and receiving the evaporated refrigerant therefrom, said pressure responsive means being responsive to the pressure in said surge tank.

20. In a system as in claim 19, means for regulating the flow of refrigerant from said refrigerant holder to said surge tank to maintain therein a predetermined quantity of unevaporated refrigerant.

21. A self-contained mobile absorption type refrigeration unit including in combination a body constructed to travel as a load transportation device and including a thermally insulated enclosure for the load, a storage holder supported by said body outside of said enclosure and constructed to enclose a store of the liquid refrigerant, a supply container constructed to enclose a supply of said liquid refrigerant and carried by said body inside of said enclosure, a pipe interconnecting the lower portion of the inside of said storage holder and the inside of said container so the vapor pressure of said liquid refrigerant in said storage holder can force a flow of said liquid refrigerant from said storage holder through said pipe into said container, an evaporator for said liquid refrigerant and carried by said body inside of said enclosure below the top of said container and having an inlet and outlet respectively connecting with the inside of said container at positions below said top and which cause said liquid refrigerant to flow gravitationally from said container into said evaporator, a receiving holder supported by said body outside of said enclosure and constructed to enclose an absorbent liquid for said refrigerant when the latter is evaporated to its vapor phase, a pipe interconnecting the inside of the top of said container and the inside of the lower portion of said receiving holder to carry said refrigerant when evaporated to its vapor phase from said container into said absorbent liquid in said receiving holder, said storage holder having a volumetric capacity storing enough of said liquid refrigerant to refrigerate a load in said enclosure for a prolonged period and by comparison therewith said supply container having a small volumetric capacity so it does not subtract appreciably from said enclosure's load carrying space, valve-controlled couplings for both said holders constructed and arranged to permit periodically charging said liquid refrigerant into said storage holder under said pressure and removal and reloading of said absorbent liquid respectively in spent and fresh condition from and into said receiving holder, and a valve for said pipe interconnecting said storage holder and said supply container and which controls said flow through the just-named pipe into said container, a chamber positioned below the top of said container and above said evaporator, a heat insulating connection between said chamber and said container and constructed and arranged to permit said liquid refrigerant to flow gravitationally to and from said chamber, and means controlled by the temperature of said chamber and automatically closing said valve when said chamber is refrigerated by said liquid refrigerant evaporating therein and opening said valve when said chamber is not so refrigerated.

22. A refrigeration unit including in combination a thermally insulated enclosure, an evaporator inside said enclosure and having inlet and outlet means and presenting a relatively large area to the inside of said enclosure, means for supplying said inlet means with a liquid refrigerant of the type used by absorption refrigeration systems, conduit means connecting said outlet means with the outside of said enclosure to exhaust the evaporated refrigerant therefrom, control means selectively opening and closing said conduit means and including a temperature responsive device connected with said control means and positioned inside said enclosure and spaced from said evaporator with said control means automatically responsive to said device and opening said conduit means when said device is above a predetermined temperature and closing said conduit means when said device is below said temperature, and automatic regulating means automatically regulating said exhaust during said opening to maintain a predetermined minimum pressure in said evaporator maintaining the latter at temperatures preventing dehydration of the air in said enclosure materially in excess of the dehydration effect by said predetermined temperature.

23. In a self-contained mobile absorption type refrigeration unit including in combination a body having an enclosure, holders supported by said body and respectively containing and enclosing the liquid refrigerant and absorbent with the latter holder outside said enclosure, an evaporator inside said enclosure, pipes connecting said evaporator in series with said holders, valves for said pipes for opening and closing them to segregate said holders from said evaporator, an outlet for emptying said absorbent holder, means for opening and closing said outlet, a pipe interconnecting the inside of the top of said refrigerant holder with the inside of said absorbent holder, and a valve for opening and closing the second-named pipe, whereby by closing the first-named valves and opening the second-named valve and means the vapor pressure in said refrigerant holder blows out the absorbent from said absorbent holder to empty the latter for reloading.

HAROLD C. HOPP.

REFERENCES CITED

The following references are of record in the file of this patent:

UNITED STATES PATENTS

| Number | Name | Date |
|---|---|---|
| 1,703,351 | Molesworth et al. | Feb. 26, 1929 |
| 1,854,090 | Wright | Apr. 12, 1932 |
| 2,374,972 | Biehl | May 1, 1945 |